United States Patent
Sundman et al.

(10) Patent No.: US 11,246,144 B2
(45) Date of Patent: Feb. 8, 2022

(54) STA AND METHOD IN A WIRELESS LOCAL AREA NETWORK

(71) Applicant: Telefonaktiebolaget LM Ericsson (publ), Stockholm (SE)

(72) Inventors: Dennis Sundman, Sollentuna (SE); Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 126 days.

(21) Appl. No.: 16/605,538

(22) PCT Filed: Dec. 11, 2017

(86) PCT No.: PCT/SE2017/051247
§ 371 (c)(1),
(2) Date: Oct. 16, 2019

(87) PCT Pub. No.: WO2018/208198
PCT Pub. Date: Nov. 15, 2018

(65) Prior Publication Data
US 2020/0128556 A1    Apr. 23, 2020

Related U.S. Application Data

(60) Provisional application No. 62/503,361, filed on May 9, 2017.

(51) Int. Cl.
| | |
|---|---|
| *H04W 72/08* | (2009.01) |
| *H04L 5/00* | (2006.01) |
| *H04L 27/26* | (2006.01) |
| *H04W 84/12* | (2009.01) |

(52) U.S. Cl.
CPC .......... *H04W 72/085* (2013.01); *H04L 5/005* (2013.01); *H04L 5/0007* (2013.01); *H04L 27/2634* (2013.01); *H04W 84/12* (2013.01)

(58) Field of Classification Search
CPC .. H04W 72/085; H04W 84/12; H04L 5/0007; H04L 5/005; H04L 27/2634
See application file for complete search history.

(56) References Cited

U.S. PATENT DOCUMENTS

| | | | |
|---|---|---|---|
| 2014/0211704 A1 | 7/2014 | Sampath et al. | |
| 2018/0019902 A1* | 1/2018 | Suh | ...... H04L 27/2602 |
| 2019/0230197 A1* | 7/2019 | Sun | ...... H04L 27/2613 |

FOREIGN PATENT DOCUMENTS

| | | |
|---|---|---|
| CN | 102598831 A | 7/2012 |
| CN | 103493420 A | 1/2014 |

(Continued)

OTHER PUBLICATIONS

Butt, Naveed, et al., "On the Feasibility to Overlay a Narrowband IoT Signal in IEEE 802.11", 2017 IEEE 28th Annual International Symposium on Personal, Indoor, and Mobile Radio Communications (PIMRC), Oct. 8, 2017, pp. 1-7.

(Continued)

*Primary Examiner* — Eric Myers
(74) *Attorney, Agent, or Firm* — Sage Patent Group

(57) ABSTRACT

A method performed by a first Station (STA) for any one out of: transmitting Narrow Band (NB) signals to, and receiving NB signals from, second STAs in a Wireless Local Area Network (WLAN) is provided. The STA performs one or more out of: Transmitting (1001) the NB signals to the second STAs, and receiving (1002) the NB signals from the second STAs. The NB signal symbol boundaries are aligned in time with symbol boundaries of a Wide Band (WB) signal transmitted by any one out of the first STA and another STA. The NB signals start with a preamble comprising an NB-Short Training Field (STF) followed by a NB-Long Training Field (LTF). The NB LTF and NB STF are designed to avoid interference between the NB signals and WB signals.

16 Claims, 13 Drawing Sheets

(56) References Cited

FOREIGN PATENT DOCUMENTS

| WO | 2012173975 | A2 | 12/2012 |
|---|---|---|---|
| WO | 2012173975 | A3 | 5/2013 |
| WO | 2017008635 | A1 | 1/2017 |
| WO | 2017070673 | A1 | 4/2017 |
| WO | 2017160774 | A1 | 9/2017 |

OTHER PUBLICATIONS

Larmo, Anna, "NB-WiFi Concept Report 2016", Ericsson Internal Technical Report; GFTE-16:001795 Uen, Dec. 21, 2016, pp. 1-234.
Perahia, Eldad, et al., "Next Generation Wireless LANs", Cambridge University Press, 2008, pp. 1-417.
Unknown, Author, "IEEE P802.11ax™/D1.1", Draft Standard for Information technology; Part 11: Wireless LAN Medium Access Control (MAC) and Physical Layer (PHY) Specifications; Amendment 6: Enhancements for High Efficiency WLAN, Feb. 2017, pp. 1-465.
Unknown, Author, "IEEE Std 802.11ah™—2016", IEEE Standard for Information technology; Specific requirements Part 11: Wireless LAN Medium Access Control(MAC) and Physical Layer (PHY) Specifications; Amendment 2: Sub 1 GHz License Exempt Operation, Dec. 7, 2016, pp. 1-594.
Fitst Chinese Office Action dated Dec. 3, 2021 for Chinese Patent Application No. 201780090585.2, 10 pages (including English translation).
Fang, Yuan; "Symbol timing synchronization for IEEE 802.11n WLAN systems", Electronic Design Engineering, vol. 21, No. 13, Jul. 2013, Baoji University of Arts and Sciences, Baoji 721016, China, pp. 117-120, 4 pages (English Abstract provided).
HTC; "UE radio access capability for WLAN", 3GPP TSG-RAN2#91bis meeting, Agenda Item 7.6.2.1, R2-154369, Malmo, Sweden, Oct. 5-9, 2015, 7 pages.

* cited by examiner

| GI | AH-STF | GI | AH-STF | GI | AH-STF | GI | AH-STF |

Fig. 5

| GI2 | AH-LTF | AH-LTF | GI | AH-LTF | GI | AH-LTF |

Fig. 6

STA AND METHOD IN A WIRELESS LOCAL AREA NETWORK

BACKGROUND

In a typical wireless communication network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Some communication technologies have a Physical layer (PHY) in which the beginning of a transmission burst (or packet) constitutes a training, or synchronization, signal. In Institute of Electrical and Electronics Engineers (IEEE) 802.11 for WLAN, referred to as 802.11, this sequence is divided into two parts; a Short Training Field (STF), and a Long Training Field (LTF). The main purpose of the STF is Automatic Gain Control (AGC), signal detection, and coarse time- and frequency synchronization. The main purpose of the LTF is fine time- and frequency synchronization, and channel estimation. It is of great importance that the STF and LTF are carefully designed since poor design may lead to performance bottlenecks. In the OFDM based 802.11 technologies, for example the IEEE 802.11 a, g, n, ac, and ax, the STF and LTF can conveniently be defined in the frequency (or subcarrier) domain.

FIG. 1 depicts a Resource Unit (RU) allocation in the 20 MHz band for IEEE 802.11ax, referred to as 802.11ax herein.

Preamble Design in Legacy 802.11

The preamble design in legacy OFDM 802.11 can be found in *Next Generation Wireless LANs—IEEE 802.11n and 802.11ac*, Eldad Perahia and Robert Stacey. Legacy 802.11 OFDM uses 64 subcarriers. Assume the STF and LTF OFDM symbols as $STF_{legacy}$ and $LTF_{legacy}$, the symbols are repeated with Cyclic Prefix CP as in FIG. 2 and FIG. 3. In these figures, GI2 has the length such as duration of 2 GI. GI means Guard Interval and in this framework is equivalent to the CP of the OFDM symbol. FIG. 2 depicts an IEEE 802.11 (legacy) STF field. The left and right are, with the numerology of legacy, equivalent. FIG. 3 depicts an IEEE 802.11 (legacy) LTF field.

Preamble Design in IEEE 802.11ax

In 802.11ax, there is additional HE-STF and HE-LTF defined in IEEE P802.11 ax™ The main purpose of the HE-STF is AGC in MIMO situations, and the main purpose of HE-LTF is for MIMO channel estimation. The details on these fields can be found in Sections 28.3.6.8 and 28.3.6.9 in IEEE P802.11ax™/D1.1—Draft Standard for Information technology—Telecommunications and Information exchange between systems Local and metropolitan area networks—Specific requirements. An overview of the packet structure for 802.11ax High Efficiency (HE) packets is shown in FIG. 4 depicting an IEEE 802.11ax signal.

Note that the HE-STF and HE-LTF are defined with the 256-Fast Fourier Transform (FFT). The length $T_{HE-STF-FIELD}$ may have different length per:

$T_{HE-STF-FIELD}=4$ μs when the transmission is a HE SU Physical layer Protocol Data Unit (PPDU), HE extended range Single User (SU) PPDU, or HE Multi User (MU) PPDU.

$T_{HE-STF-FIELD}=8$ μs when the transmission is a HE trigger-based PPDU.

Similarly, the length $T_{HE-LTF-FIED}$ may have different values. First, if there are several spatial streams, we have that $$T_{HE-LTF-FIELD} = N_{LTF} T_{HE-LTF-SYM},$$

$$\text{where } N_{LTF} = \begin{cases} N_{STS}, \text{ if } N_{STS} = 1, 2, 4, 6, 8 \\ N_{STS} + 1, \text{ if } N_{STS} = 3, 5, 7 \end{cases}$$

Here, $N_{STS}$ denotes the number of space-time streams. Furthermore, we have that the guard interval for the data $T_{GI,Data}$ can take three different values, $T_{GI1,Data}$, $T_{GI2,Data}$, $T_{GI3,Data}$, depending on the configuration. The value of the duration of the HE-LTF, $T_{HE-LTF-SYM}$, can also have different durations according to the expressions below.

$$T_{HE\text{-}LTF\text{-}SYM} = T_{GI} + T_{HE\text{-}LTF},$$

where $T_{GI} = \begin{cases} 0.8 \text{ μs if } T_{GI,Data} = T_{GI1,Data} \\ 1.6 \text{ μs if } T_{GI,Data} = T_{GI2,Data} \\ 3.2 \text{ μs if } T_{GI,Data} = T_{GI3,Data} \end{cases}$ and $T_{HE\text{-}LTF} = \begin{cases} T_{HE\text{-}LTF\text{-}1X} = 3.2 \text{ μs} \\ T_{HE\text{-}LTF\text{-}2X} = 6.4 \text{ μs} \\ T_{HE\text{-}LTF\text{-}4X} = 12.8 \text{ μs} \end{cases}$

SUMMARY

It is an object of embodiments herein to improve the performance of a wireless communications network such as a WLAN using NB signalling.

According to a first aspect of embodiments herein, the object is achieved by a method performed by a first Station, STA, for any one out of: transmitting Narrow Band, NB, signals to, and receiving NB signals from, second STAs in a Wireless Local Area Network, WLAN, the method comprising one or more out of: Transmitting the NB signals to the second STAs, and receiving the NB signals from the second STAs.

The NB signal symbol boundaries are aligned in time with symbol boundaries of a Wide Band, WB, signal transmitted by any one out of the first STA and another STA. The NB signals start with a preamble comprising an NB-Short Training Field, NB STF followed by a NB-Long Training Field, NB LTF. The NB LTF and NB STF are designed to avoid interference between the NB signals and WB signals.

According to a second aspect of embodiments herein, the object is achieved by a first Station, STA, for any one out of: transmitting Narrow Band, NB, signals to, and receiving NB signals from, second STAs in a Wireless Local Area Network, WLAN, such as a Wi-Fi network, Which WLAN e.g. is based on OFDMA, the first STA being configured to one or more out of: Transmit the NB signals to the second STAs, and receive the NB signals from the second STAs.

The NB signal symbol boundaries are adapted to be aligned in time with symbol boundaries of a Wide Band, WB, signal transmitted by any one out of the first STA and another STA. The NB signals are adapted to start with a preamble comprising an NB-Short Training Field, NB STF followed by a NB-Long Training Field, NB LTF, which NB LTF and NB STF are designed to avoid interference between the NB signals and WB signals.

Despite not being obvious, the above design of the NB LTF and NB STF, to avoid interference between the NB signals and WB signals, results in an unexpected good coexistence of NB signals such as NB-WiFi signals, including STF and LTF, and WB OFDMA signals in IEEE 802.11ax.

This in turn results in an improved performance of a wireless communications network such as a WLAN using NB signaling.

BRIEF DESCRIPTION OF THE DRAWINGS

Examples of embodiments herein are described in more detail with reference to attached drawings in which:

Figures 2, 3:
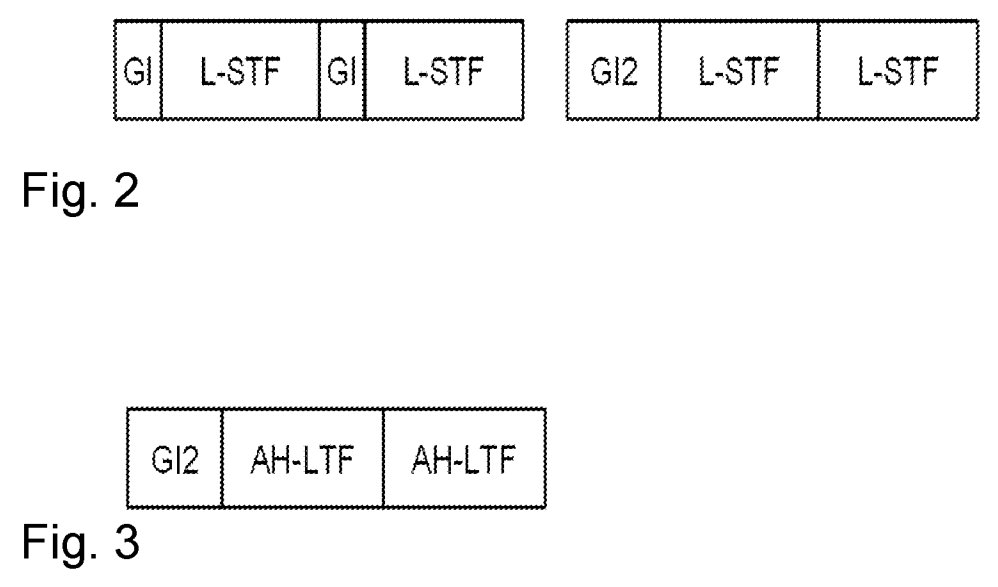

FIG. 2 is a schematic block diagram according to prior art
FIG. 3 is a schematic block diagram according to prior art.
FIG. 5 is a schematic block diagram according to prior art.
FIG. 6 is a schematic block diagram according to prior art.

DETAILED DESCRIPTION

Figure 1:
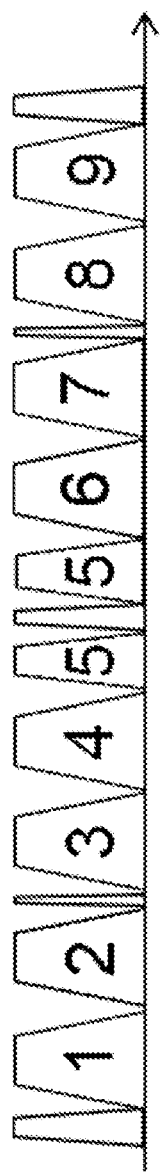
FIG. 1 is a schematic block diagram according to prior art.

As a part of developing embodiments herein a problem will first be identified and discussed.

Narrow Band (NB)-WiFi and Long Range Low Power (LRLP)

A work initiated from a study group within IEEE called long range low power (LRLP) has previously been discussed. The idea with LRLP is to enable a narrowband operation in the 2.4 GHz and 5 GHz Industrial, Scientific and Medical (ISM) bands. Most notably, good coexistence with 802.11ax is considered. Henceforth, a technology enabling narrowband operation in the 2.4 GHz and 5 GHz ISM bands is referred to as NB-WiFi.

In the 20 MHz bandwidth (BW) operation of IEEE 802.11ax, the spectrum can be divided into 9 Resource Units (RU's) of roughly 2 MHz BW each. Each RU comprises 26 subcarriers. Assigning two subcarriers for zero, DC carrier and inter-RU carrier, and two subcarriers for pilot signals, there are 22 subcarriers remaining for data.

In NB-WiFi, IEEE 802.11ax signals can coexist with NB-WiFi signals using Orthogonal Frequency Division Multiple Access (OFDMA) in IEEE 802.11ax, leaving one or more RUs free for NB-WiFi signals. It is then important to consider intercarrier interference. In the downlink, typically a 2 MHz BW device will receive the NB signal. In the uplink, typically the Access Point (AP) will sample the channel at a rate of 20 MHz or higher to receive the NB signal concurrently with underlying IEEE 802.11ax signals.

Cyclic Prefix in IEEE 802.11ax and NB-WiFi

In IEEE 802.11ax, there are three different choices for the length of the cyclic prefix: 0.8 us, 1.6 us, and 3.2 us. Considering a 256 point FFT for the 20 MHz channel, this corresponds to 16, 32, and 64 samples.

Assuming the NB-WiFi using one RU from the IEEE 802.11ax numerology, a 32 point FFT may be used to define a 2.5 MHz channel. Assuming a 2.5 MHz sampling rate, the 20 MHz CPs used in IEEE 802.11ax thus become 2, 4, and 8 samples long.

Preamble Design in IEEE 802.11ah

One flavor of IEEE 802.11 is the ah standard amendment IEEE P802.11ah™/D10.0—Draft Standard for Information technology—Telecommunications and information exchange between systems Local and metropolitan area networks—Specific requirements. IEEE 802.11ah was designed for operation in the sub 1 GHz band. It is designed with five BW modes: 1 MHz, 2 MHz, 4 MHz, 8 MHz, and 16 MHz. In the 1 MHz BW mode, the PHY is designed based on OFDM using 32 subcarriers.

For details on the STF design in IEEE 802.11ah 1 MHz, see Section 23.3.8.3.2 in IEEE P802.11ah. The definition of one OFDM symbol of the STF (referred to as AH-STF symbol or 1M-STF symbol) becomes, in a basic single spatial stream scenario the following in the frequency domain:

$$STF_{ah} = [0.5, -1, 1, -1, -1, -0.5] \frac{1+j}{\sqrt{2/3}}$$

for subcarriers $k = [-12, -8-4, 4, 8, 12]$, respectively.

The remaining 26 subcarriers are 0. This OFDM symbol is then repeated with Guard Interval (GI) as in FIG. 5 depicting an IEEE 802.11 ah STF for 1M.

Similarly, for details on the LTF design in IEEE 802.11ah 1 MHz, see Section 23.3.8.3.3 in IEEE P802.11ah™. In a single spatial stream scenario, the definition of a single OFDM symbol, referred to as AH-LTF symbol or 1M-LTF symbol, becomes in the frequency domain:
$LTF_{ah}$=[0, 0, 0, 1, −1, 1, −1, −1, 1, −1, 1, 1, −1, 1, 1, 1, 0, −1, −1, −1, 1, −1, −1, −1, 1, −1, 1, 1, 1, −1, 0, 0]

Figure 7:
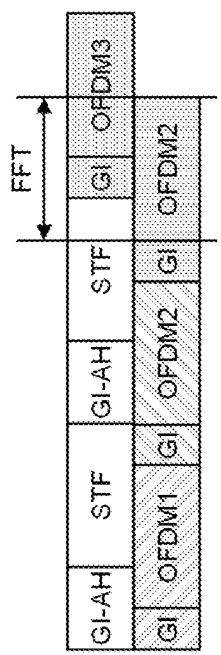
FIG. 7 is a schematic block diagram illustrating some problem discussion as when developing embodiments herein.

This OFDM symbol is then repeated with CP as in FIG. 6. In this figure, GI2 has the length of 2 GIs. FIG. 7 depicts an IEEE 802.11 ah LTF for 1M.

For NB-WiFi, there are currently no STF and LTF fields defined. In addition, it is desirable to design STF and LTF that re-use as much as possible from the existing IEEE 802.11 standards.

Three problems may arise when multiplexing NB-WiFi STA's and IEEE 802.11ax STAs using OFDMA.

Figure 4:
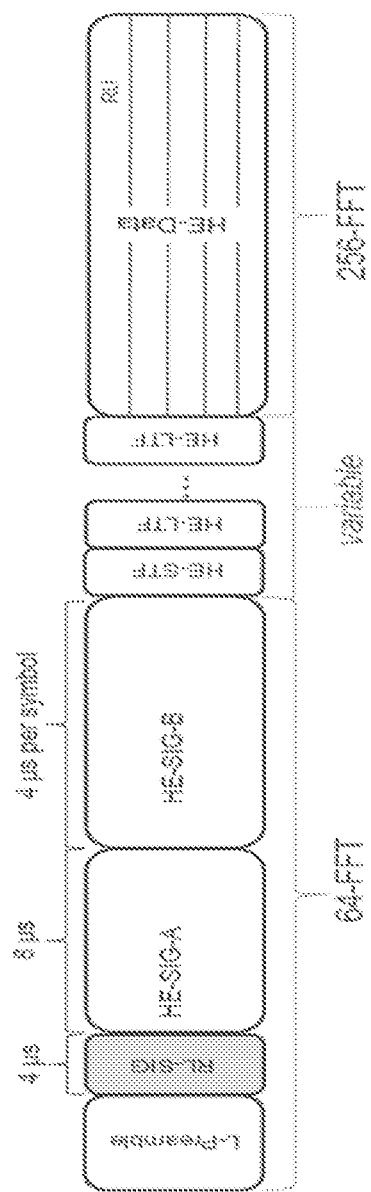
FIG. 4 is a schematic block diagram according to prior art.

First, the IEEE 802.11ax preamble uses a mixed OFDM numerology, see FIG. 4, while NB-WiFi STA's support only one OFDM numerology.

Second, the length of some fields in the IEEE 802.11ax preamble is variable, and even the duration of some OFDM symbols is variable, due to the use of frequency domain undersampling.

Third, a NB-WiFi STA cannot decode the IEEE 802.11ax preamble, and therefore cannot decode the physical layer header that describes the characteristics of the multi-user PPDU. These problems must be addressed in the design of the multi-user packet preamble.

It is undesirable to put a NB-WiFi signal overlapping on the legacy preamble, legacy Signal field (SIG), HE-SIG-A, HE-SIG-B because it will cause interference with the legacy systems due to the use of different OFDM numerologies. When the length of the HE-STF and HE-LTF fields is long enough, these may be used to overlap NB-WiFi signals. However, the length of these fields is variable and the NB-WiFi STA cannot detect the length of these fields.

There are some problems by re-using existing STF designs: The legacy STF cannot be re-used since it is based on 54 active subcarriers and not 24.

The HE-STF as defined over the subcarriers of the desired RU may be used, but here six problems may arise:

First: For most RU's, the long HE-STF contains four active subcarriers, which may not be enough.

Second: For some RU's, the long HE-STF contains three active subcarriers, which may not be enough.

Third: For most RU's, the short HE-STF contains two active subcarriers.

Fourth: On some RU's, short the HE-STF contains only one active subcarrier.

Fifth: The location of the active subcarriers varies within each RU. This adds complexity to the receiver.

Sixth: The length of the HE-STF is not dependent on the GI of the data. The NB-WiFi requires an RX filter, which introduces ISI, which is compensated by the CP. In time dispersive channels that require a long GI, the RX filter will add to the time dispersion and the receiver performance may be degraded if the STF does not possess a GI that is long enough.

The design of the 1M-STF used in IEEE 802.11ah may be re-used, but there are also problems with this:

First, the format with one GI before each STF symbols is not suitable in the case of more than one STF symbol, because the period of the 1M-STF is 6.4 μs. Thus using the periodicity of 1M-STF as GI-AH means that a wide-band receiver (typically the AP in the uplink), will suffer performance loss since the subcarriers will not be orthogonal over the full 20 MHz band.

FIG. 1 depicts a problem with using 1M-STF. Decoding of WB system (lower part of figure) will suffer interference from the NB device due to lack of orthogonality (upper part).

Second: If the GI of the WB OFDMA data is used, the 1M-STF will experience discontinuities in the time domain, which is inconvenient for autocorrelation based detectors.

Problems re-using existing LTF designs: The legacy LTF cannot be used since it is based on 54 active subcarriers and not 24.

The HE-LTF-1X and HE-LTF-2X as defined over the desired RU are not suitable because they contain many subcarriers that are 0. The HE-LTF-4X for the 20 MHz channel may be used as defined over the active subcarriers. The main challenge with this is that the HE-LTF-4X will look different over different RU's, thus increasing the receiver complexity.

The 1M-LTF defines 26 active subcarriers. In one RU we only have 24 available subcarriers. Therefore, the 1M-LTF can be used if the two outermost subcarriers are zeroed such as discarded.

Embodiments Herein

An object of embodiments herein may therefore be to improve the performance of a wireless communications network e.g. a WLAN such as a NB-WiFi.

Embodiments herein provide a combination of the knowledge learned in previous standards which results in a great synergy effect. Based largely on the 802.11ah preamble designs, ingenious modifications are made resulting in an unexpected good coexistence with WB OFDMA signals in IEEE 802.11ax.

Figure 8:
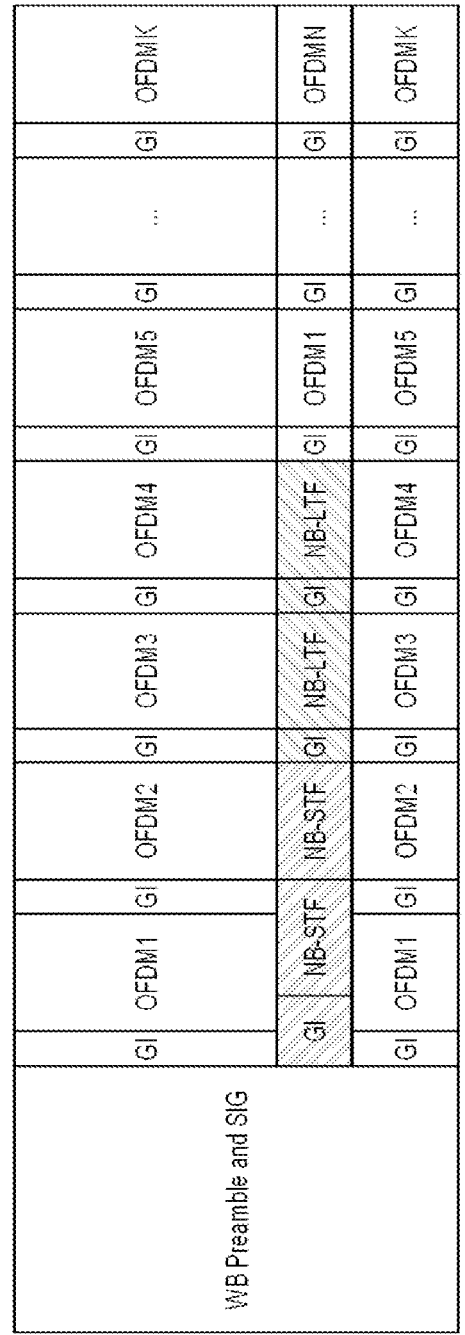
FIG. 8 is a schematic block diagram according to an embodiment.

The NB-WiFi signal according to some example embodiments, including STF and LTF, is placed so that it overlaps only with the HE-Data field, see FIG. 8. Moreover, the STF and LTF are designed so that they do not cause interference to adjacent IEEE 802.11ax STA's, while re-using some key parts the IEEE 802.11ah STF and LTF, to obtain good time domain properties, e.g. low PAPR and good synchronization performance.

Embodiments herein e.g. work in UL, DL, for device to device and concurrently with WB traffic on another RU's. It is a natural combination of lessons learned in legacy, IEEE 802.11ah and IEEE 802.11ax preamble designs. An advantage with embodiments herein is that they are simple in the sense that it is independent on which RU is used. Some embodiments herein relates to Preamble Design for NB-WiFi.

According to some example embodiments herein, STF and LTF design for 2 MHz narrowband (NB) STAs for good coexistence with wideband (WB) 802.11ax STAs, concurrently transmitting using OFDMA are provided. Any of the RUs 1-4 and 6-9 may be considered, but RU 5 may be omitted. The 20 MHz with corresponding 2 MHz bands is depicted in FIG. 1 described above.

Figure 9B:
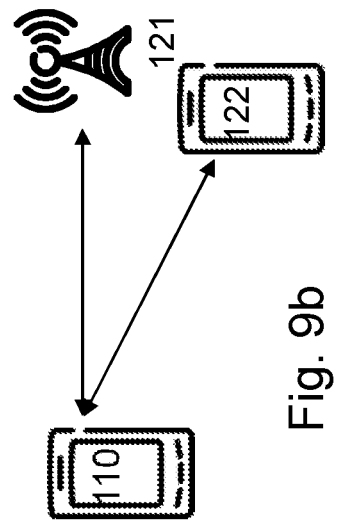
FIGS. 9a, b and c are schematic block diagrams depicting embodiments of a wireless communications network.
Figure 9C:
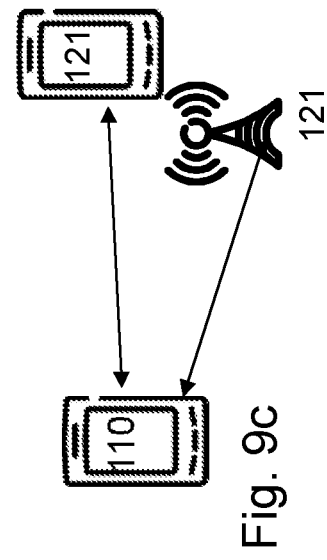
Figure 9A:
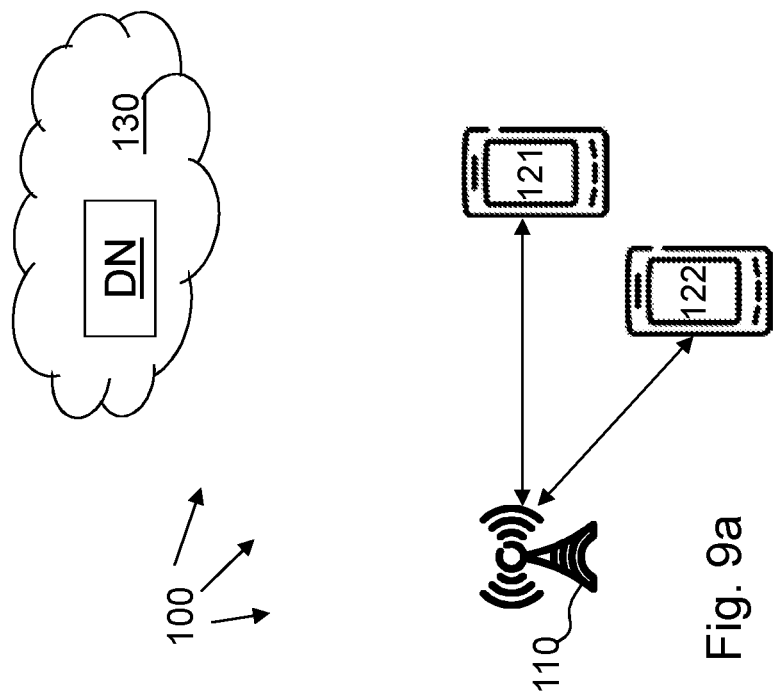

FIGS. 9a, b and c depicts example scenarios of a wireless communications network 100 in which embodiments herein may be implemented. The wireless communication network 100 may be a telecommunication network and may use a number of different technologies. For example WLANs such as Wi-Fi and NB-WiFi, e.g. is based on OFDMA. Further e.g. Long Term Evolution (LTE), LTE-Advanced, 5G, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Some embodiments herein may relate to recent technology trends that are of particular interest in a 5G context, e.g. comprising a NR and LTE context, such as eMBB and URLLC. However, embodiments are also applicable in further development of other existing wireless communication systems such as e.g. WLAN, WCDMA.

A number of Stations (STAs) operate in the wireless communication network 100, whereof one, a first STA 110 is depicted in FIG. 9. The STA 110 provides radio coverage over a geographical area. The STA 110 may be a transmission and reception point e.g. a radio access network node such as a Wireless Local Area Network (WLAN) access point or an Access Point Station (AP STA), a non-Access Point (non-AP) STA, an NB STA (for example a NB-WiFi STA), a WB STA (for example an 802.11ax STA), an access controller, a base station, e.g. a radio base station such as a NodeB, an evolved Node B (eNB, eNode B), a 5G base station such as a gNB, a base transceiver station, a radio remote unit, an Access Point Base Station, a base station router, a transmission arrangement of a radio base station, a stand-alone access point or any other network unit capable of communicating with another STA such as a User Equipment (UE) within the service area served by the STA 110 depending on the radio access technology and terminology used. The STA 110 may be referred to as a serving STA and it may be seen as the STA 110 communicates to a STA 121, 122 with DL transmissions and from the STA 121, 122 in Uplink (UL) transmissions. However, it may be the other way around.

In the wireless communication network 100, one or more second STAs such as e.g. a second STA 121 and a second STA 122 operate. The one or more second STAs, 121 may further be and be referred to as: a communication device, a wireless device, a mobile station, a non-AP STA, an AP STA, a STA, an NB STA, a low power STA, a user equipment and/or a wireless terminals, communicate via one or more Access Networks, e.g. RAN, to one or more core networks (CN). It should be understood by the skilled in the art that "STA" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Embodiments herein may be implemented in different example scenarios:

In an example scenario of FIG. 9a, the first STA 110 is an AP STA, the second STA 121 is a non-AP STA and the second STA 122 is a non-AP STA.

In an example scenario of FIG. 9b, the first STA 110 is a non-AP STA, the second STA 121 is an AP STA, and the second STA 122 is a non AP STA or an AP STA.

In an example scenario of FIG. 9c, the first STA 110 is a non-AP STA, the second STA 121 is a non-AP STA and second STA 122 is a non AP STA or an AP STA.

Methods for transmitting Narrow Band, NB, signals to, or receiving NB signals from, second STAs 121, 122 e.g. in a LAN 100 such as a Wi-Fi network, is performed by the first STA 110. As an alternative, a Distributed Node (DN) and functionality, e.g. comprised in a cloud 130 as shown in FIG. 9a, b, c, may be used for performing or partly performing the methods.

Figure 10:
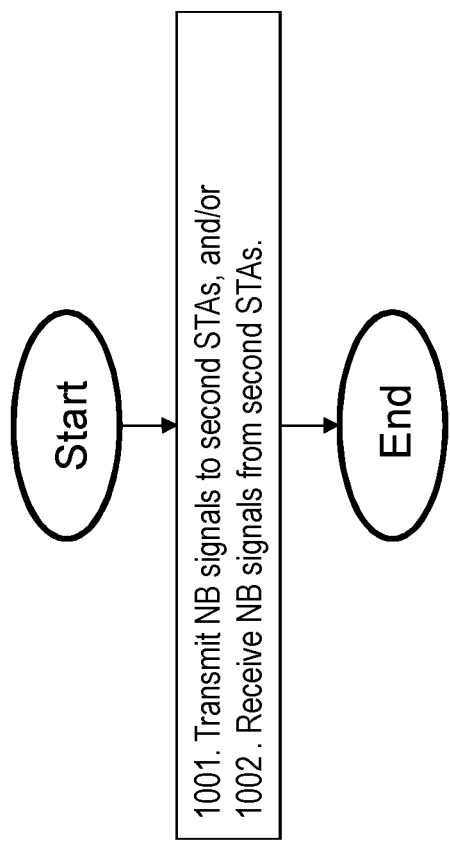
FIG. 10 is a flowchart illustrating embodiments of method in a first STA

Example embodiments of a flowchart depicting embodiments of a method performed by the first STA 110 for transmitting NB, signals to, or receiving NB signals from, second STAs 121, 122 in a WLAN 100 such as e.g. a Wi-Fi network, is depicted in FIG. 10. The second STAs e.g. comprise one or more NB STAs 121 and possibly one or more Wide Band, WB, STAs 122. The WLAN is based on OFDMA. The method will first be described in a general way followed by a more detailed and exemplified description with further extensions and variations. The method comprises one or more of the actions 1001 and 1002 actions in any suitable order:

Action 1001: The first STA 110 transmits the NB signals to the second STAs 121, 122.

Action 1002: The first STA 110 receives the NB signals from the second STAs 121, 122.

The NB signal symbol boundaries are aligned in time with symbol boundaries of a WB signal transmitted by the first STA 110 or another STA. The NB signals start with a preamble comprising an NB STF followed by an NB LTF. The NB LTF and NB STF are designed to avoid interference between the NB signals and WB signals.

Embodiments of NB STF

In some embodiments the NB STF is designed to avoid interference between the NB signals and WB signals by comprising a number of STF OFDM symbols that are preceded by a guard interval of a length also referred to as duration comprising: The number of STF OFDM symbols times a length of a guard interval according to a WB system.

In some embodiments each OFDM symbol out of the number $N_{STF}$ of OFDM symbols may be an STF field according to IEEE 802.11ah.

In some alternative embodiments, each OFDM symbol out of the number $N_{STF}$ of OFDM symbols comprises an OFDM symbol such as e.g. a subband of an OFDM symbol from an STF according to IEEE 802.11ax, with zeros on non-active subcarriers of the NB signal. The subband may e.g. be a set of consecutive subcarriers with a total bandwidth not exceeding the bandwidth of the NB signal.

The number $N_{STF}$ of OFDM symbols may e.g. be 2 or a multiple of 2. Further, 4 may also be a good choice in some cases, e.g. when a repetition code is added to increase coverage.

Embodiments of NB LTF

In some embodiments the NB LTF is designed to avoid interference between the NB signals and WB signals by comprising a number $N_{LTF}$ of OFDM symbols, where each one of the number $N_{LTF}$ of OFDM symbols is preceded by a guard interval according to a WB system.

In some embodiments each of the OFDM symbols comprised in the number $N_{LTF}$ of OFDM symbols are generated by a 32-Inverse Fast Fourier Transform, IFFT, of a sequence comprising:

[0, 0, 0, 0, −1, 1, −1, −1, 1, −1, 1, 1, −1, 1, 1, 1, 0, −1, −1, −1, 1, −1, −1, −1, 1, −1, 1, 1, 1, 0, 0, 0].

In some alternative embodiments each of the OFDM symbols comprised in the number $N_{LTF}$ of OFDM symbols are generated by a 26-Inverse Fast Fourier Transform, IFFT, of a sequence comprising:

[0, −1, 1, −1, −1, 1, −1, 1, 1, −1, 1, 1, 1, 0, −1, −1, −1, 1, −1, −1, −1, 1, −1, 1, 1, 1].

Each of the OFDM symbols out of the number of OFDM symbols may comprise OFDM symbols, such as e.g. a subband of an OFDM symbol, from an LTF according to IEEE 802.11ax, with zeros on non-active subcarriers of the NB signal. The subband may e.g. be a set of consecutive subcarriers with a total bandwidth not exceeding the bandwidth of the NB signal.

The number $N_{LTF}$ of OFDM symbols may e.g. be 2 or a multiple of 2.

In some embodiments, any one or more out of a concurrent WB system, the WB signals and WB STAs 122 relate to a WB standard of IEEE 802.11ax.

According to embodiments herein the NB LTF and NB STF are designed to avoid interference between the NB signals and WB signals. This, results in an unexpected good coexistence of NB-WiFi signals including STF and LTF and WB OFDMA signals in IEEE 802.11ax.

Further Extensions and Variations

In the following, embodiments herein are explained and illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Embodiments herein may provide designed training fields suitable for NB-WiFi based on OFDM. First, the length of the fields and the placements of GI's will be explained and discussed. Then, the sequences used will be explained and discussed. Since the design is slightly different between the NB STF and NB LTF, they will be treated separately.

Length of Training Fields and Guard Intervals

NB STF

The NB STF, also referred to as NB-STF, will for NB users such as the one or more STAs 121 mainly be used for packet detection, AGC, and coarse time synchronization. To that end, it is important that the signal has good time domain properties. It is typically not in the interest of the receiver to recover the frequency domain symbols, i.e., it is not interesting to perform the FFT, or IFFT, of the NB STF. Since low power devices are targeted, a long enough training field is important. According to an example embodiment, the work already carried out in IEEE 802.11ah, e.g. for the 2 MHz mode, may be followed and have the number of OFDM symbols N_STF=2. To ensure good time domain properties, and good orthogonally properties to eventual co-existing wide-band transmissions, a design where the two NB STF OFDM symbols are preceded with a GI of length two times the GI of the data is provided. See FIG. 12, depicting an NB STF design.

Figure 12:
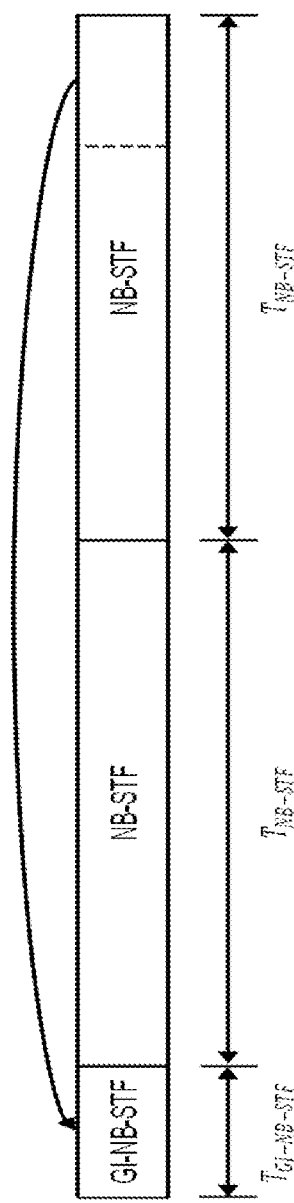
FIG. 12 is a schematic block diagram according to an embodiment.

Referring to FIG. 12, the lengths are as follows:

$T_{NB\ STF} = 12.8$ μs, $T_{GI\text{-}NB\text{-}STF} = N_{STF} T_{GI}$, where $T_{GI} = \begin{cases} 0.8\ \mu s & \text{if } T_{GI,Data} = T_{GI1,Data} \\ 1.6\ \mu s & \text{if } T_{GI,Data} = T_{GI2,Data} \\ 3.2\ \mu s & \text{if } T_{GI,Data} = T_{GI3,Data} \end{cases}$ The preferred embodiment is, as already mentioned, the number of OFDM symbols $N_{STF}=2$, but other values are possible, for example $N_{STF}=3$. The T (GI, Data) is the length of the GI of the WB signal, and equivalently the length of the GI of the Data field of the NB signal.

NB LTF

The NB LTF also referred to as NB-LTF, will for NB users such as the one or more STAs 121 mainly be used for fine time-/frequency synchronization and channel estimation. The NB LTF will be used both by WB receivers such as the one or more STAs 122 and NB receivers such as the one or more STAs 121. Therefore, performing time-/frequency synchronization and channel estimation in frequency domain is a good approach. This will for a WB receiver such as the one or more STAs 122 typically entail 20 MHz sampling and a 256-FFT and selecting the appropriate subcarrier. To that end, a good frequency domain property of the NB LTF is essential. It is provided to let the NB LTF be structured in a similar way as the HE-LTF, see in FIG. 13 depicting an NB LTF design.

Figure 13:
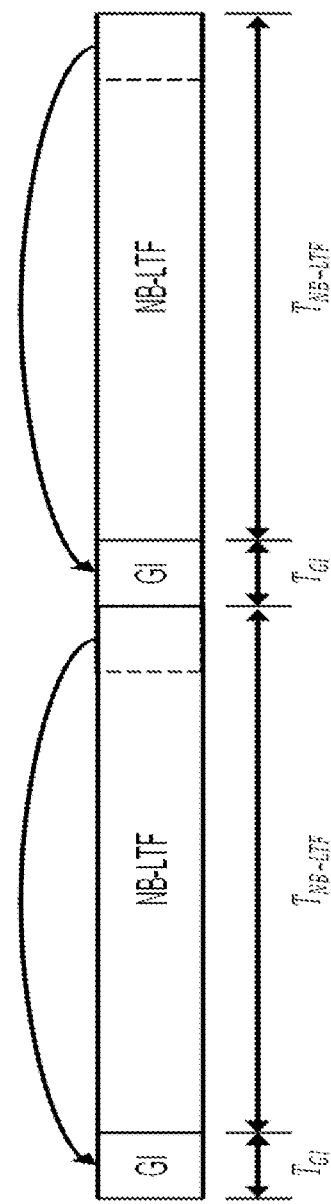
FIG. 13 is a schematic block diagram according to an embodiment.

Referring to FIG. 13, the lengths are as follows:

$T_{NB\text{-}LTF} = 12.8$ μs, $T_{GI} = \begin{cases} 0.8\ \mu s & \text{if } T_{GI,Data} = T_{GI1,Data} \\ 1.6\ \mu s & \text{if } T_{GI,Data} = T_{GI2,Data} \\ 3.2\ \mu s & \text{if } T_{GI,Data} = T_{GI3,Data} \end{cases}$ The number of OFDM symbols of the NB LTF may for example be N_LTF=2, but other choices are possible. The T_(GI, Data) is the length of the GI of the WB signal and equivalently the length of the GI of the Data field of the NB signal. To get the total length of the field, we must also consider the number of spatial streams N_STS as in prior art.

Signal Design of NB STF and NB LTF in Frequency Domain

NB STF

Subcarriers available for the NB STA are −12 to −1 and 1 to 12. Thus, the tones of 1M-STF may immediately be used for the NB STF.

NB LTF

As mentioned above, the $N_{LTF}$ of OFDM symbols comprised in the number $N_{LTF}$ of OFDM symbols may e.g. be a 32-Inverse IFFT of a sequence or a 26-IFFT of a sequence.

Tones on 1M-LTF are present on subcarriers −13 to −1 and 1 to 13. It is provided in some example embodiments herein to bandlimit the 1M-LTF and take the tones defined on 1M-LTF between −12 to −1 and 1 to 12 to use for the NB LTF. Defined by a 32-FFT (over 2.5 MHz BW) it becomes as follows:

$LTF_{NB,32}$=[0, 0, 0, 0, −1, 1, −1, −1, 1, −1, 1, 1, −1, 1, 1, 1, 0, −1, −1, −1, 1, −1, −1, −1, 1, −1, 1, 1, 1, 0, 0, 0] and equivalently defined by a 26-FFT (over 2.03125 MHz BW) it becomes as follows:

$LTF_{NB,26}$=[0, −1, 1, −1, −1, 1, −1, 1, 1, −1, 1, 1, 1, 0, −1, −1, −1, 1, −1, −1, −1, 1, −1, 1, 1, 1]

The periodicity of the NB LTF may be such that there will be discontinuities between a first NB LTF and the GI of a second NB LTF. However, this should not be a performance bottleneck for the receiver.

It should be noted that the second STAs 121, 122 may be referred to as receivers, and the first STA 110 may also be referred to as a receiver.

FIG. 8 Showing Provided Design Together with WB Signal According to Embodiments Herein Referring again to FIG. 8, it is schematically shown how the OFDMA IEEE 802.11ax system can coexist with an NB system by the NB STF and NB LTF design provided by embodiments herein. FIG. 8 depicts a WB and NB signal at the same time. The top and bottom row correspond to the WB signal using OFDMA, while the mid-row shows the NB signal with the proposed NB STF and NB LTF. The WB Preamble and SIG are the same as is encoded with 64-FFT and the HE-STF and HE-LTF from FIG. 4.

According to embodiments herein, a packet format e.g. for a multi-user Physical layer Protocol Data Unit (PPDU) in an OFDMA system, is designed and provided for concurrent operation of NB STA's such as second STAs 121 and WB STA's, such as the second STAs 122, where the NB signals entirely overlap in time with the data part of the WB signals, and where the NB signals start with a preamble containing a NB STF followed by a NB LTF.

Example Embodiments 1-5 of the NB STF

1. A NB STF field is designed such that
   a. $N_{STF}$ OFDM symbols are created
   b. Pre-appended to the $N_{STF}$ OFDM symbols is a guard interval of length $N_{STF}$ times GI.
2. As in 1, where the $N_{STF}$ OFDM symbols each are the AH-STF OFDM symbol.
3. As in 1, where the $N_{STF}$ OFDM symbols each are the OFDM symbols from the HE-STF with zeros on the non-active subcarriers.
4. As in 1-32, where GI is the GI length of the OFDM(A) symbols used to for communication between wide band STA's.
5. As in 4 where the wide band system is 802.11ax.
6. As in 1-5, where $N_{STF}$ is 2.

Example Embodiments 1-7 of the NB LTF

1. A NB LTF field is designed such that
   a. $N_{LTF}$ OFDM symbols are created
   b. Pre-appended to each of the $N_{LTF}$ OFDM symbols is a GI.
2. As in 1, where the $N_{LTF}$ OFDM symbols are the 32-IFFT of the sequence [0, 0, 0, 0, −1, 1, −1, 1, 1, −1, 1, 1, −1, 1, 1, 1, 0, −1, −1, −1, 1, −1, −1, −1, 1, −1, 1, 1, 1, 0, 0, 0].
3. As in 1, where the $N_{LTF}$ OFDM symbols are the 26-IFFT of the sequence [0, −1, 1, −1, 1, 1, −1, 1, 1, −1, 1, 1, 1, 0, −1, −1, −1, 1, −1, −1, −1, 1, −1, 1, 1, 1].
4. As in 1, where the $N_{LTF}$ OFDM symbols each are the OFDM symbols from the HE-LTF with zeros on the non-active subcarriers.
5. As in 1-4, where the GI is the GI length of the OFDM(A) symbols in a concurrent wide band system.
6. As in 5, where the wide band system is 802.11ax.
7. As in 1-4, where $N_{LTF}$ is 2.

Figure 11:
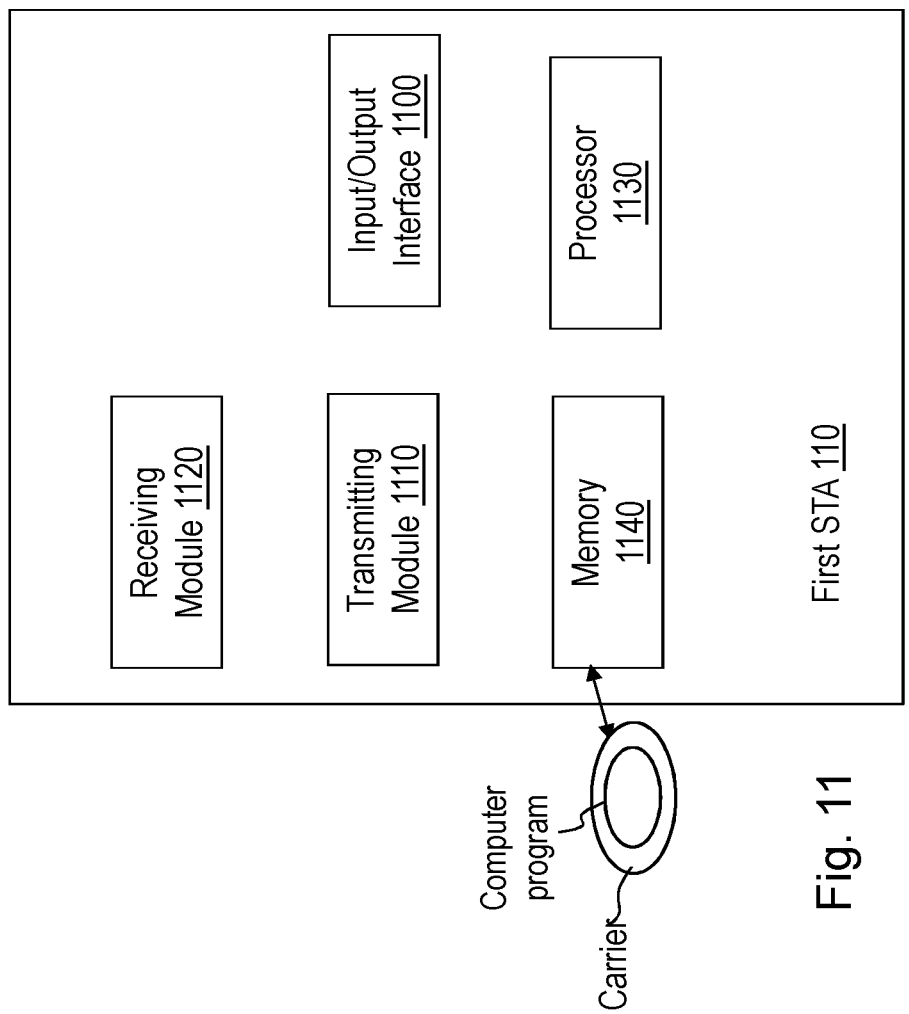
FIG. 11 is a schematic block diagram illustrating embodiments of a first STA.

To perform the method actions of a method performed by the first STA 110 for transmitting NB, signals to, or receiving NB signals from, second STAs 121, 122 in a WLAN 100, the first STA 110 may comprise the arrangement depicted in FIG. 11. The WLAN e.g. is based on OFDMA.

The first STA 110 may comprise an input and output interface 1100 configured to communicate with the second STAs 121, 122. The input and output interface 1100 may comprise a wireless receiver (not shown) and a wireless transmitter (not shown).

The first STA is configured to one or more out of:
transmit the NB signals to the second STAs 121, 122, e.g. by means of a transmitting module 1110 in the first STA 110, and
receive the NB signals from the second STAs 121, 122, e.g. by means of a receiving module 1120 in the first STA 110,
which second STAs e.g. are adapted to comprise one or more NB STAs 121 and possibly one or more Wide Band, WB, STAs 122, wherein the NB signal symbol boundaries are adapted to be aligned in time with symbol boundaries of a WB signal transmitted by the first STA 110 or another STA, and wherein the NB signals are adapted to start with a preamble comprising a NB-Short Training Field, STF followed by a NB-Long Training Field, LTF, which NB LTF and NB STF are adapted to be designed to avoid interference between the NB signals and WB signals.

The embodiments herein may be implemented through a respective processor or one or more processors, such as the processor 1130 of a processing circuitry in the first STA 110 depicted in FIG. 11 together with computer program code for performing the functions and actions of the embodiments herein. The program code mentioned above may also be provided as a computer program product, for instance in the form of a data carrier carrying computer program code for performing the embodiments herein when being loaded into the first STA 110. One such carrier may be in the form of a CD ROM disc. It is however feasible with other data carriers such as a memory stick. The computer program code may furthermore be provided as pure program code on a server and downloaded to the first STA 110.

The first STA 110 may further comprise respective a memory 1140 comprising one or more memory units. The memory comprises instructions executable by the processor in the first STA 110.

The memory 1140 is arranged to be used to store e.g. packet formats, information, data, configurations, and applications to perform the methods herein when being executed in the first STA 110.

In some embodiments, a respective computer program comprises instructions, which when executed by the at least one processor 1130, cause the at least one processor of the first STA 110 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the first STA 110, described above may refer to a combination of analog and digital circuits, and/or one or more processors configured with software and/or firmware, e.g. stored in the first STA 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The following example Embodiments 1-22 refer to FIG. 9a,b,c, FIG. 10, and FIG. 11.

Embodiment 1

A method performed by a first Station, STA, 110 for transmitting Narrow Band, NB, signals to, or receiving NB signals from, second STAs 121, 122 in a Wireless Local Area Network, WLAN, 100 such as a W-Fi network, Which WLAN e.g. is based on OFDMA, the method comprising one or more out of:

transmitting 1001 the NB signals to the second STAs 121, 122, and receiving 1002 the NB signals from the second STAs 121, 122, which second STAs e.g. comprises one or more NB STAs 121 and possibly one or more Wide Band, WB, STAs 122, wherein the NB signal symbol boundaries are aligned in time with symbol boundaries of a WB signal transmitted by the first STA 110 or another STA, and wherein the NB signals start with a preamble comprising a NB-Short Training Field, STF followed by a NB-Long Training Field, LTF, which NB LTF and NB STF are designed to avoid interference between the NB signals and WB signals.

Embodiment 2

The method according to Embodiment 1, wherein the NB STF is designed to avoid interference between the NB signals and WB signals by comprising a number $N_{STF}$ of STF OFDM symbols are preceded by a guard interval of a length comprising: the number $N_{STF}$ of STF OFDM symbols times a length of a guard interval according to a WB system.

Embodiment 3

The method according to Embodiment 2, wherein each OFDM symbol, may also referred to as STF field, out of the number $N_{STF}$ of OFDM symbols is an STF according to IEEE 802.11ah.

Embodiment 4

The method according to any of the Embodiments 1-3, wherein each OFDM symbol out of the number $N_{STF}$ of OFDM symbols comprises an OFDM symbol from an STF according to IEEE 802.11ax, with zeros on non-active subcarriers of the NB signal.

Embodiment 5

The method according to any of the Embodiments 2-4, where the number $N_{STF}$ of STF OFDM symbols is 2.

Embodiment 6

The method according to any of the Embodiments 1-5, wherein the NB LTF is designed to avoid interference between the NB signals and WB signals by comprising the NB LTF comprises a number $N_{LTF}$ of OFDM symbols, where each one of the number $N_{LTF}$ of OFDM symbols is preceded by a guard interval according to a WB system.

Embodiment 7

The method according to Embodiment 6, wherein the $N_{LTF}$ of OFDM symbols comprised in the number $N_{LTF}$ of OFDM symbols are a 32-Inverse Fast Fourier Transform, IFFT, of a sequence comprising:

[0, 0, 0, 0, −1, 1, −1, −1, 1, −1, 1, 1, −1, 1, 1, 1, 0, −1, −1, −1, 1, −1, −1, −1, 1, −1, 1, 1, 1, 0, 0, 0].

Embodiment 8

The method according to Embodiment 6, wherein the $N_{LTF}$ of OFDM symbols comprised in the number $N_{LTF}$ of OFDM symbols are a 26-Inverse Fast Fourier Transform, IFFT, of a sequence comprising:

[0, −1, 1, −1, −1, 1, −1, 1, 1, −1, 1, 1, 1, 0, −1, −1, −1, 1, −1, −1, −1, 1, −1, 1, 1, 1].

Embodiment 9

The method according to Embodiment 6, wherein each of the $N_{LTF}$ of OFDM symbols out of the number $N_{LTF}$ of OFDM symbols comprises OFDM symbols from an LTF according to IEEE 802.11ax, with zeros on non-active subcarriers of the NB signal.

Embodiment 10

The method according to any of the Embodiments 6-9, wherein the number $N_{LTF}$ of OFDM symbols is 2.

Embodiment 11

The method according to any of the Embodiments 1-10, wherein any one or more out of a concurrent WB system, the WB signals and WB STAs 122 relate to a WB standard of IEEE 802.11ax.

Embodiment 12

A computer program comprising instructions, which when executed by a processor, cause the processor to perform actions according to any of the Embodiments 1-11.

Embodiment 13

A carrier comprising the computer program of Embodiment 12, wherein the carrier is one of an electronic signal, an optical signal, an electromagnetic signal, a magnetic signal, an electric signal, a radio signal, a microwave signal, or a computer-readable storage medium.

Embodiment 14

A first Station, STA, 110 for transmitting Narrow Band, NB, signals to, or receiving NB signals from, second STAs 121, 122 in a Wireless Local Area Network, WLAN, 100 such as a Wi-Fi network, Which WLAN e.g. is based on OFDMA, the first STA being configured to one or more out of:

transmit the NB signals to the second STAs 121, 122, e.g. by means of a transmitting module 1110 in the first STA 110, and receive the NB signals from the second STAs 121, 122, e.g. by means of a receiving module 1120 in the first STA 110, which second STAs e.g. are adapted to comprise one or more NB STAs 121 and possibly one or more Wide Band, WB, STAs 122, wherein the NB signal symbol boundaries are adapted to be aligned in time with symbol boundaries of a WB signal transmitted by the first STA 110 or another STA, and wherein the NB signals are adapted to start with a preamble comprising a NB-Short Training Field, STF followed by a NB-Long Training Field, LTF, which NB LTF and NB STF are adapted to be designed to avoid interference between the NB signals and WB signals.

Embodiment 15

The first STA 110 according to Embodiment 14, wherein the NB STF is adapted to be designed to avoid interference between the NB signals and the WB signals by comprising a number $N_{STF}$ of STF OFDM symbols being preceded by a guard interval of a length comprising: the number $N_{STF}$ of STF OFDM symbols times a length of a guard interval according to a WB system.

Embodiment 16

The first STA 110 according to Embodiment 15, wherein each OFDM symbol, may also referred to as STF field, out of the number $N_{STF}$ of OFDM symbols is adapted to be an STF according to IEEE 802.11ah.

Embodiment 17

The method according to any of the Embodiments 13-15, wherein each OFDM symbol out of the number $N_{STF}$ of OFDM symbols is adapted to comprise an OFDM symbol from an STF according to IEEE 802.11ax, with zeros on non-active subcarriers of the NB signal.

Embodiment 18

The first STA 110 according to any of the Embodiments 14-17, where the number $N_{STF}$ of STF OFDM symbols is adapted to be 2.

Embodiment 19

The first STA 110 according to any of the Embodiments 14-18, wherein the NB LTF is adapted to be designed to avoid interference between the NB signals and WB signals by comprising a number $N_{LTF}$ of OFDM symbols, where each one of the number $N_{LTF}$ of OFDM symbols is adapted to be preceded by a guard interval according to a WB system.

Embodiment 20

The first STA 110 according to Embodiment 19, wherein the $N_{LTF}$ of OFDM symbols comprised in the number $N_{LTF}$ of OFDM symbols are adapted to be a 32-Inverse Fast Fourier Transform, IFFT, of a sequence comprising:
[0, 0, 0, 0, −1, 1, −1, −1, 1, −1, 1, 1, −1, 1, 1, 1, 0, −1, −1, −1, 1, −1, −1, −1, 1, −1, 1, 1, 1, 0, 0, 0].

Embodiment 21

The first STA 110 according to Embodiment 19, wherein the $N_{LTF}$ of OFDM symbols comprised in the number $N_{LTF}$ of OFDM symbols are adapted to be a 26-Inverse Fast Fourier Transform, IFFT, of a sequence comprising:
[0, −1, 1, −1, −1, 1, −1, 1, 1, −1, 1, 1, 1, 0, −1, −1, −1, 1, −1, −1, −1, 1, −1, 1, 1, 1].

Embodiment 22

The first STA 110 according to Embodiment 19, wherein each of the $N_{LTF}$ of OFDM symbols out of the number $N_{LTF}$ of OFDM symbols is adapted to comprise OFDM symbols from an LTF according to IEEE 802.11ax, with zeros on non-active subcarriers of the NB signal.

Embodiment 23

The first STA 110 according to any of the Embodiments 19-22, wherein the number $N_{LTF}$ of OFDM symbols is adapted to be 2.

Embodiment 24

The first STA 110 according to any of the Embodiments 14-23, wherein any one or more out of a concurrent WB system, the WB signals and WB STAs 122 is adapted to relate to a WB standard of IEEE 802.11ax.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Abbreviations

| ABBREVIATIONS | |
|---|---|
| Abbreviation | Explanation |
| FFT | Fast Fourier Transform |
| GI | Guard Interval |
| IFFT | Inverse Fast Fourier Transform |
| LTF | Long Training Field |
| OFDM | Orthogonal Frequency Division Multiplexing |
| OFDMA | Orthogonal Frequency Division Multiple Access |
| STF | Short Training Field |

Figure 14:
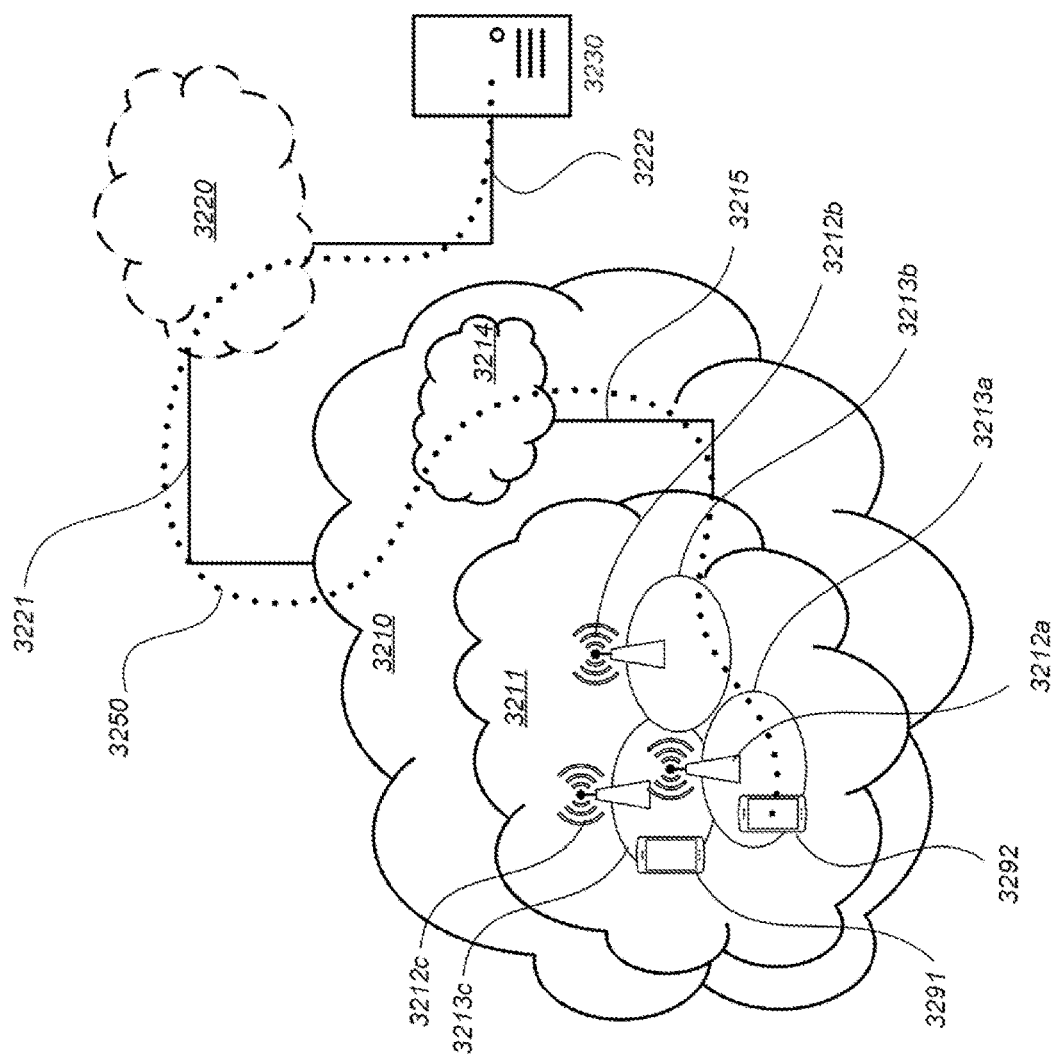
FIG. 14 schematically illustrates a telecommunication network connected via an intermediate network to a host computer.

With reference to FIG. 14, in accordance with an embodiment, a communication system includes a telecommunication network 3210 e.g. a WLAN, such as a 3GPP-type cellular network, which comprises an access network 3211, such as a radio access network, and a core network 3214. The access network 3211 comprises a plurality of base stations 3212a, 3212b, 3212c, such as AP STAs e.g. the first STA 110, NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the second STAs 121, 122 such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 14 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 15) served by the base station 3320. The communication interface 3326 may be configured to facilitate a connection 3360 to the host computer 3310. The connection 3360 may be direct or it may pass through a core network (not shown in FIG. 15) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 15 may be identical to the host computer 3230, one of the base stations 3212a, 3212b, 3212c and one of the UEs 3291, 3292 of FIG. 14, respectively. This is to say, the inner workings of these entities may be as shown in FIG. 15 and independently, the surrounding network topology may be that of FIG. 14.

Figure 15:
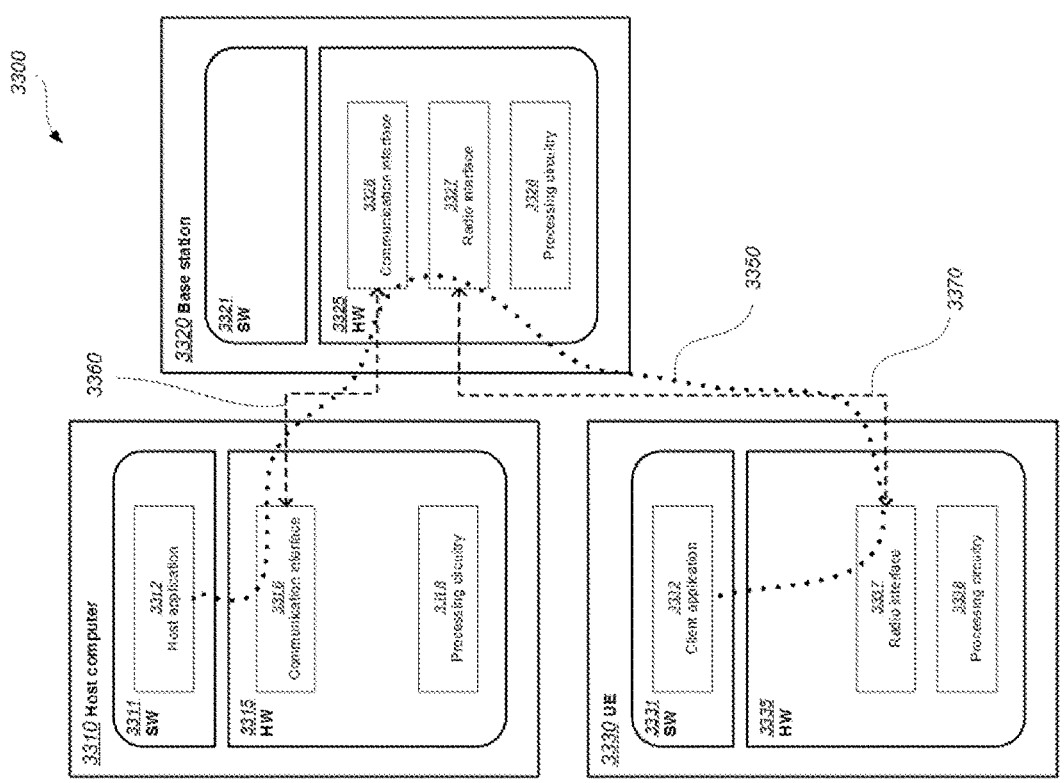
FIG. 15 is a generalized block diagram of a host computer communicating via a base station such as an AP STA with a user equipment such as a non-AP STA over a partially wireless connection.

In FIG. 15, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 16:
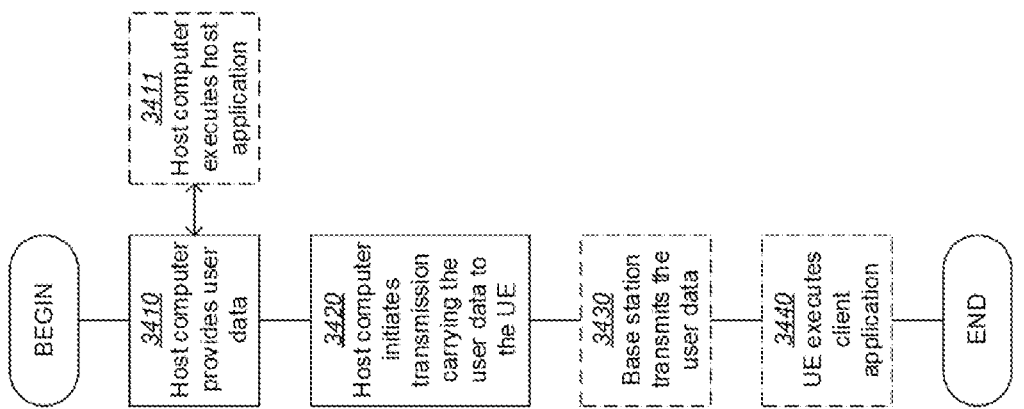

FIG. 16 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 16 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 17:
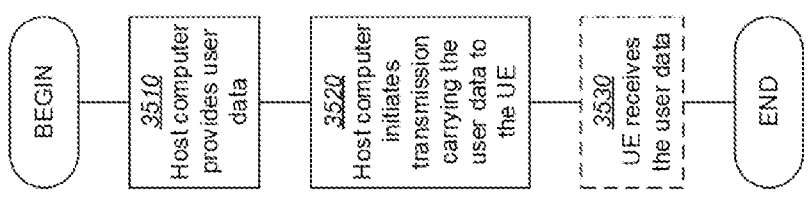
FIGS. 16 to 19 are flowcharts illustrating methods implemented in a communication system including a host computer, base station such as an AP STA and a user equipment such as a non-AP STA.

FIG. 17 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 17 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 18:
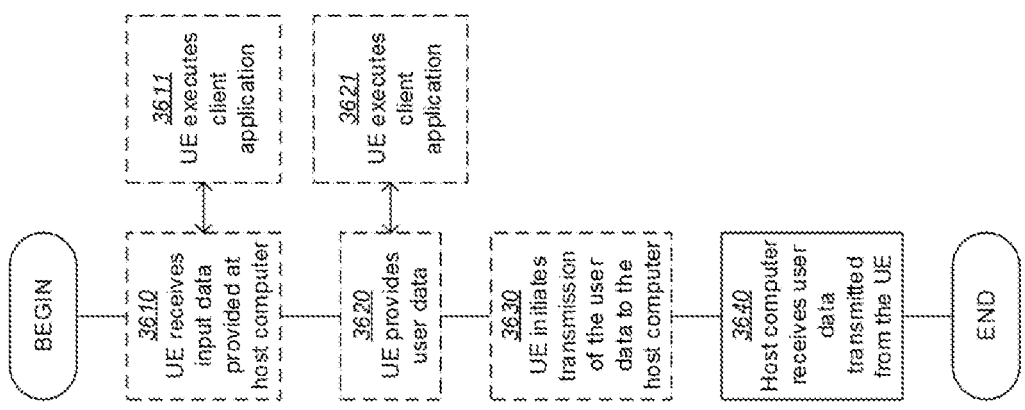

FIG. 18 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 18 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 19:
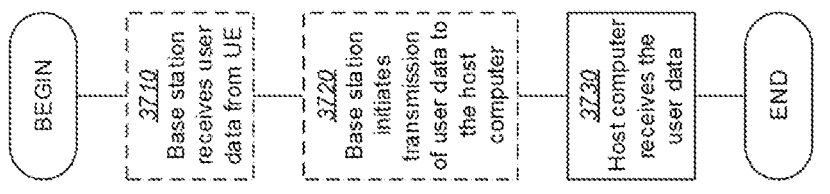

FIG. 19 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 19 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The invention claimed is:

1. A method performed by a first Station (STA), the method comprising:
   transmitting Narrow Band (NB) signals to, or receiving NB signals from, second Stations (STAs) in a Wireless Local Area Network (WLAN);
   wherein symbol boundaries of the transmitted or received NB signals are aligned in time with symbol boundaries of a Wide Band (WB) signal transmitted by another STA; and
   wherein the transmitted or received NB signals start with a preamble comprising an NB Short Training Field (STF) followed by an NB Long Training Field (LTF), wherein the NB STF is adapted to avoid interference between the transmitted or received NB signals and the WB signal by comprising a number $N_{STF}$ of Orthogonal Frequency Division Multiplexing (OFDM) symbols that are preceded by a guard interval of a length comprising: the number $N_{STF}$ of OFDM symbols times a length of a guard interval according to a WB system, and
   wherein the NB LTF is adapted to avoid interference between the transmitted or received NB signals and the WB signal by comprising the NB LTF comprising the number $N_{LTF}$ of OFDM symbols, where each one of the number $N_{LTF}$ of OFDM symbols is preceded by a guard interval according to the WB system.

2. The method according to claim 1, wherein each OFDM symbol, out of the number $N_{STF}$ of OFDM symbols, is an STF field according to IEEE 802.11ah.

3. The method according to claim 1, wherein each OFDM symbol, out of the number $N_{STF}$ of OFDM symbols, comprises an OFDM symbol from an STF according to IEEE 802.11ax, with zeros on non-active subcarriers of an NB signal.

4. The method according to claim 1, wherein the number $N_{STF}$ of STF OFDM symbols is 2.

5. The method according to claim 1, wherein each of the OFDM symbols comprised in the number $N_{LTF}$ of OFDM symbols are generated by a 32-Inverse Fast Fourier Transform (IFFT) of a sequence comprising:
[0, 0, 0, 0, −1, 1, −1, −1, 1, −1, 1, 1, −1, 1, 1, 1, 0, −1, −1, −1, 1, −1, −1, −1, 1, −1, 1, 1, 1, 0, 0, 0].

6. The method according to claim 1, wherein each of the OFDM symbols comprised in the number $N_{LTF}$ of OFDM symbols are generated by a 26-Inverse Fast Fourier Transform (IFFT) of a sequence comprising:
[0, −1, 1, −1, −1, 1, −1, 1, 1, −1, 1, 1, 1, 0, −1, −1, −1, 1, −1, −1, −1, 1, −1, 1, 1, 1].

7. The method according to claim 1, wherein each of the OFDM symbols out of the number of OFDM symbols comprises OFDM symbols from an LTF according to IEEE 802.11ax, with zeros on non-active subcarriers of an NB signal.

8. The method according to claim 1, wherein the number $N_{LTF}$ of OFDM symbols is 2.

9. A first Station (STA) comprising:
processing circuitry configured to transmit Narrow Band (NB) signals to, or receive NB signals from, second Stations (STAs) in a Wireless Local Area Network (WLAN);
wherein symbol boundaries of the transmitted or received NB signals are aligned in time with symbol boundaries of a Wide Band (WB) signal transmitted by another STA; and
wherein the transmitted or received NB signals start with a preamble comprising an NB Short Training Field (STF) followed by an NB Long Training Field (LTF),
wherein the NB STF is adapted to avoid interference between the transmitted or received NB signals and the WB signal by comprising a number $N_{STF}$ of Orthogonal Frequency Division Multiplexing (OFDM) symbols that are preceded by a guard interval of a length comprising: the number $N_{STF}$ of OFDM symbols times a length of a guard interval according to a WB system and
wherein the NB LTF is adapted to avoid interference between the transmitted or received NB signals and the WB signal by comprising the NB LTF comprising the number $N_{LTF}$ of OFDM symbols, where each one of the number $N_{LTF}$ of OFDM symbols is preceded by a guard interval according to the WB system.

10. The first STA according to claim 9, wherein each OFDM symbol, out of the number $N_{STF}$ of OFDM symbols, is an STF field according to IEEE 802.11ah.

11. The first STA according to claim 9, wherein each OFDM symbol, out of the number $N_{STF}$ of OFDM symbols, comprises an OFDM symbol from an STF according to IEEE 802.11ax, with zeros on non-active subcarriers of an NB signal.

12. The first STA according to claim 9, wherein the number $N_{STF}$ of STF OFDM symbols is 2.

13. The first STA according to claim 9, wherein each of the OFDM symbols comprised in the number $N_{LTF}$ of OFDM symbols are generated by a 32-Inverse Fast Fourier Transform (IFFT) of a sequence comprising:
[0, 0, 0, 0, −1, 1, −1, −1, 1, −1, 1, 1, −1, 1, 1, 1, 0, −1, −1, −1, 1, −1, −1, −1, 1, −1, 1, 1, 1, 0, 0, 0].

14. The first STA according to claim 9, wherein each of the OFDM symbols comprised in the number $N_{LTF}$ of OFDM symbols are generated by a 26-Inverse Fast Fourier Transform (IFFT) of a sequence comprising:
[0, −1, 1, −1, −1, 1, −1, 1, 1, −1, 1, 1, 1, 0, −1, −1, −1, 1, −1, −1, −1, 1, −1, 1, 1, 1].

15. The first STA according to claim 9, wherein each of the OFDM symbols out of the number of OFDM symbols comprises OFDM symbols from an LTF according to IEEE 802.11ax, with zeros on non-active subcarriers of an NB signal.

16. The first STA according to claim 9, wherein the number $N_{LTF}$ of OFDM symbols is adapted to be 2.

\* \* \* \* \*